Figure 2:
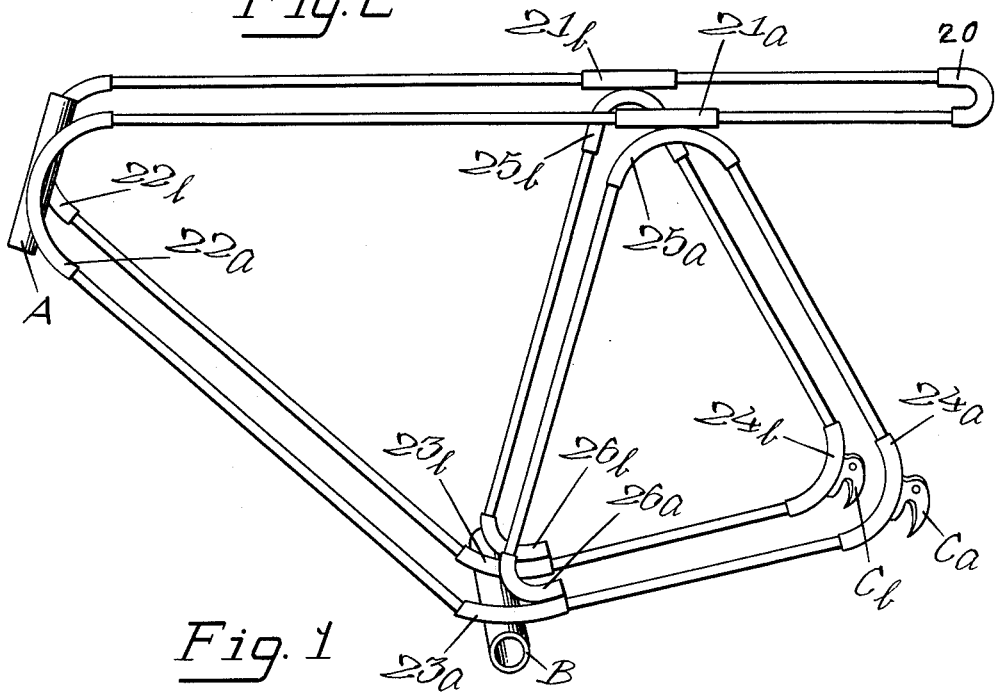

Dec. 28, 1965 YUKO OTANI 3,226,132
FRAME OF A BICYCLE
Filed July 16, 1963

INVENTOR:
YUKO OTANI
BY E. M. Squire
ATTORNEY.

3,226,132
FRAME OF A BICYCLE
Yuko Otani, 1850 4-chome Ogumachi, Arakawa-ku,
Tokyo, Japan
Filed July 16, 1963, Ser. No. 295,494
Claims priority, application Japan, Nov. 21, 1962,
37/50,948; Feb. 14, 1963, 38/5,998
4 Claims. (Cl. 280—281)

This invention relates to a frame of a bicycle.

An object of the invention is to provide a frame of bicycle which substantially consists in its entirety of a single continuous length of rigid tubing, without using joint portions such as upper and lower pipes, a head pipe, a mast pipe, or a back stay. This dispenses with the usual heat treatment necessary for soldering or welding joint portions. The frame in accordance with the invention, shortens the finishing process, and is excellent in strength, elasticity and appearance as well as being light in weight.

Another object of this invention is to provide a frame having a luggage carrier formed integrally with the frame, thereby reducing the weight of a frame and simplifying the process of manufacturing.

Still another object of this invention is to provide a frame comprising sleeve members enclosing portions of the tubing which are to be welded and bent, fitted with fittings such as a head pipe, a hanger and so forth thereby facilitating welding and providing a rigid body as well as a neat bending form in the tubing.

Another object of this invention is to provide a frame consisting particularly of light metal alloy tubing, the welded parts being enclosed in steel sleeve members for reducing the weight of the whole frame to a large extent, while not reducing its strength, but capable of sustaining heavy loads and shocks during operation and also providing a long life.

Other objects and advantages of this invention are explained clearly in the following description with reference to the drawings showing preferred embodiments of the invention.

Figure 1:
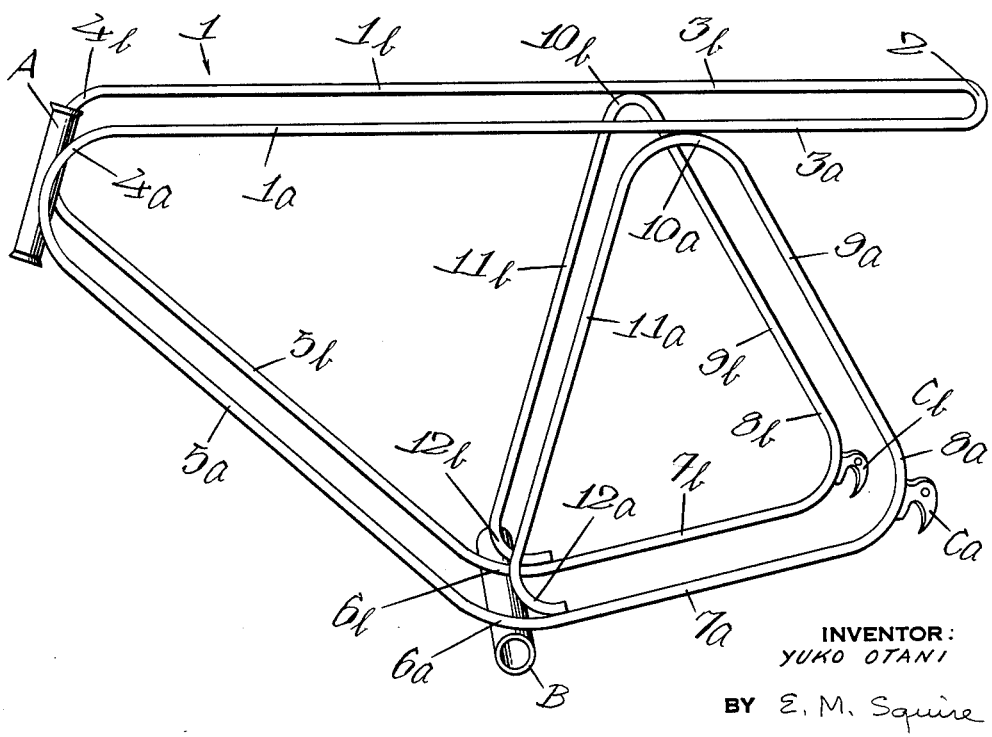

In the drawing,

FIGURE 1 is a perspective view of a complete bicycle frame according to the invention, and FIGURE 2 is a perspective view of a modified embodiment including sleeve members.

Referring first to FIGURE 1, 1a, 1b are parallel upper horizontal reaches of the single length of tubing. The numeral 2 designates the U-bend portion at the end of luggage carrier reaches 3a, 3b at the rear, the U-bend 2 being located at the midpoint of a continuous length of steel tubing constituting the entire frame. The numerals 4a, 4b designate front bends for fitting a head pipe A at the forward end of upper horizontal reaches 1a, 1b and these bends connect to rearwardly and downwardly inclined reaches 5a, 5b. The numerals 6a, 6b designate lower bends for fitting a hanger B underneath the oblique reaches 5a, 5b which are connected to rear reaches 7a, 7b. The numerals 8a, 8b designate rear bends carrying rear wheel hanger fittings Ca Cb of rear reaches 7a, 7b which are connected to upwardly and forwardly inclined reaches 9a, 9b. The numerals 10a, 10b designate upper bends of oblique back fork reaches 9a, 9b for fixing a seat post. These upper bends are positioned between forward horizontal reaches 1a, 1b and horizontal luggage carrier reaches 3a, 3b, being connected to forward and downwardly inclined reaches 11a, 11b. The numerals 12a, 12b designate lower end portions of oblique reaches 11a, 11b, and are fixed on the foremost upper sides of reach reaches 7a, 7b adjacent to a tubular hanger B. The above-mentioned front and lower bends are interconnected by welding or other suitable means by which all necessary parts as, for instance, a head pipe A, a hanger B, and rear wheel engaging hanger fittings Ca, Cb are welded to form the frame assembly.

Referring now to FIGURE 2, a frame is made of a single continuous length of a light alloy tubing which is bent as described above. At the midpoint of the length of tubing there is fitted a steel sleeve 20 which, together with the portion of pipe 1 enclosed therein, is bent in U-form thus making a bent portion. The parallel horizontally extending reaches are fitted with sleeves 21a, 21b intermediate their ends and further steel sleeves 22a, 22b at their front ends, the sleeves 22a, 22b, being bent downwardly and rearwardly. The oblique reaches which extend downward are fitted with steel sleeves 23a, 23b at their lower bends and then extend as rear reaches. The rear bends are enclosed in steel sleeves 24a, 24b from which the tubing extends obliquely upward. At the upper bends, there are fitted arcuately bent steel sleeves 25a, 25b. The terminal reaches are fitted at their lower ends with arcuately bent steel sleeves 26a, 26b. Under these conditions steel sleeves 21a, 21b, 25a, 25b and steel sleeves 23a, 23b, 26a, 26b contact each other. Hereupon, between steel sleeves 22a, 22b is provided a head pipe A and these three parts are welded together. The steel sleeves 23a, 23b, 26a, 26b are placed on the upper surface of a hanger B and those five portions are welded together and also the steel pipes 21a, 21b, 25a, 25b are welded together. To the steel sleeves 24a, 24b are welded rear axle engaging brackets Ca, Cb. The tubing is connected in the steel sleeves to be substantially unitary. The sleeves are bent with the tubing enclosed therein.

While I have shown and described what I believe to be the best embodiments of my invention, it will be apparent to those skilled in the art that various changes and modifications may be made therein without departing from the spirit and scope of the invention as defined in the appended claims.

What I claim is:

1. A bicycle frame member comprising a single continuous length of rigid tubing, said tubing having a U-bend formed therein at the midpoint of its length, said tubing extending forwardly of said frame and comprising two spaced parallel horizontal reaches which form the legs of said U-bend, said tubing having two spaced parallel front bends formed therein at the forward ends of said horizontal reaches, said tubing extending downwardly and rearwardly from said front bends in two spaced parallel first oblique reaches, said tubing having two spaced parallel lower bends formed therein at the lower ends of said first oblique reaches, said tubing extending rearwardly from said lower bends in two spaced parallel rear reaches to a location spaced beneath said horizontal reaches, said tubing having two spaced parallel rear bends formed therein at the rear ends of said rear reaches, said tubing extending upwardly and forwardly from said rear bends in two spaced parallel second oblique reaches to locations adjacent to said horizontal reaches and situated forwardly of said U-bend, said tubing having two spaced parallel upper bends formed therein at the upper ends of said second oblique reaches, said tubing extending forwardly and downwardly from said upper bends in two spaced parallel third oblique reaches to positions adjacent to said lower bends, the ends of said tubing being located at the lower ends of said third oblique reaches and the ends of said tubing being secured to laterally spaced portions thereof at said lower bends.

2. A frame member according to claim 1, further comprising a tubular sleeve member surrounding the portion of said tubing located in said U-bend; a pair of laterally spaced sleeve members surrounding the portions of said tubing included in said horizontal reaches and located above said upper bends; a pair of laterally spaced sleeve members enclosing the portions of said tubing included in said front bends; a pair of laterally spaced sleeve members enclosing the portions of said tubing included in said lower bends; a pair of laterally spaced sleeve members enclosing the portions of said tubing included in said rear bends; a pair of laterally spaced sleeve members enclosing the portions of said tubing included in said upper bends; means securing each of said last named sleeve members to one of said pair of sleeve members which surround the portions of said tubing included in said horizontal reaches; a pair of sleeve members enclosing the end portions of said tubing, and means securing each of said end portion enclosing sleeve members to one of said pair of sleeve members which surround the portions of said tubing included in said lower bends.

3. A frame member according to claim 2, further comprising tubular means the axis of which lies in a vertical plane and is upwardly and rearwardly inclined, said tubular means interconnecting said laterally spaced sleeve members which enclose the portions of said tubing included in said front bends; further tubular means the axis of which extends horizontally transversely of said frame, said further tubular means interconnecting said laterally spaced sleeve members which enclose the portions of said tubing included in said lower bends; and rear axle engaging means carried by said sleeve members which enclose the portions of said tubing included in said rear bends.

4. A frame member according to claim 1, further comprising tubular means the axis of which lies in a vertical plane and is upwardly and rearwardly inclined, said tubular means being secured to and interconnecting laterally spaced portions of said tubing included in said front bends; further tubular means the axis of which extends horizontally transversely of said frame, said further tubular means being secured to and interconnecting laterally spaced portions of said tubing included in said lower bends; and rear axle engaging means carried by the portions of said tubing which are included in said rear bends.

References Cited by the Examiner
UNITED STATES PATENTS

| | | | |
|---|---|---|---|
| 506,194 | 10/1893 | Hopkins | 280—281 |
| 2,187,020 | 1/1940 | Dunn | 280—281 |
| 2,595,075 | 4/1952 | Henderson | 280—281 X |

FOREIGN PATENTS

| | | |
|---|---|---|
| 123,128 | 10/1948 | Sweden. |
| 689,864 | 4/1953 | Great Britain. |
| 1,120,844 | 7/1956 | France. |

BENJAMIN HERSH, *Primary Examiner.*

KENNETH H. BETTS, A. HARRY LEVY, *Examiners*